(12) United States Patent
Fioravanti

(10) Patent No.: US 6,898,043 B2
(45) Date of Patent: May 24, 2005

(54) DUAL STAGE ENCLOSURE FOR SERVO TRACK WRITER UTILIZING LOW-DENSITY GAS

(75) Inventor: Louis John Fioravanti, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 272 days.

(21) Appl. No.: 10/314,027

(22) Filed: Dec. 6, 2002

(65) Prior Publication Data

US 2003/0214748 A1 Nov. 20, 2003

Related U.S. Application Data

(63) Continuation-in-part of application No. 10/151,118, filed on May 20, 2002.
(60) Provisional application No. 60/396,620, filed on Jul. 17, 2002.

(51) Int. Cl.[7] ................................................ G11B 21/02
(52) U.S. Cl. ...................................... 360/75; 360/97.02
(58) Field of Search ............................... 360/75, 97.02, 360/97.03, 86, 137

(56) References Cited

U.S. PATENT DOCUMENTS

| | | |
|---|---|---|
| 3,566,960 A | 3/1971 | Stuart |
| 3,785,853 A | 1/1974 | Kirkman et al. |
| 3,875,589 A | 4/1975 | Applequist et al. |
| 3,976,555 A | 8/1976 | Von Hartel |
| 4,294,021 A | 10/1981 | Turnbull et al. |
| 4,514,672 A | 4/1985 | O'Qwynn |
| 4,642,715 A | 2/1987 | Ende |
| 4,980,783 A | 12/1990 | Moir et al. |
| 4,989,160 A | 1/1991 | Garrett et al. |
| 5,243,479 A * | 9/1993 | Nakagoshi et al. ...... 360/98.01 |
| 5,414,591 A | 5/1995 | Kimura et al. |
| 5,493,474 A | 2/1996 | Schkrohowsky et al. |
| 5,774,294 A | 6/1998 | Fioravanti |
| 5,798,459 A | 8/1998 | Ohba et al. |
| 6,018,437 A | 1/2000 | Weichett et al. |
| 6,084,738 A | 7/2000 | Duffy |
| 6,144,178 A | 11/2000 | Hirano et al. |
| 6,147,831 A | 11/2000 | Kennedy et al. |
| 6,167,749 B1 | 1/2001 | Yanagisawa et al. |
| 6,178,059 B1 | 1/2001 | Frees |
| 6,289,678 B1 | 9/2001 | Pandolfi |
| 6,320,744 B1 | 11/2001 | Sullivan et al. |
| 6,430,000 B1 | 8/2002 | Rent |

FOREIGN PATENT DOCUMENTS

| | | |
|---|---|---|
| GB | 2334611 A | 8/1999 |
| JP | 2001266519 | 3/2000 |
| JP | 2001332047 | 9/2000 |

* cited by examiner

*Primary Examiner*—Sinh Tran
*Assistant Examiner*—K. Wong
(74) *Attorney, Agent, or Firm*—Fellers, Snider, et al.

(57) ABSTRACT

A method of writing servo patterns on a disc in an external servo track writer ("STW") includes enclosing the disc and an actuator arm within an internal enclosure, while additionally enclosing the internal enclosure and the remainder of the STW by an outer cover. The internal enclosure is filled with a low-density gas prior to writing the servo patterns on the disc. Gas overflowing from the internal enclosure is contained by the outer cover which further retains the low-density gas once the internal enclosure is opened at the conclusion of the servo writing process. The low-density gas is then purged from the STW for recycling before the outer cover is opened and the disc is removed. The internal enclosure may comprise two separate components moveable between an open and closed position to allow for loading and removal of the disc from a spindle motor of the STW.

19 Claims, 5 Drawing Sheets

DUAL STAGE ENCLOSURE FOR SERVO TRACK WRITER UTILIZING LOW-DENSITY GAS

RELATED APPLICATIONS

This application is a continuation-in-part of U.S. patent application Ser. No. 10/151,118, entitled "Disc Drive Servo Track Writer Utilizing Low-Density Gas," filed May 20, 2002, and naming inventors Louis J. Fioravanti, Steve T. Sheeran, Randy L. Oxley and Jerry D. Pasi.

This application claims priority of U.S. provisional application Ser. No. 60/396,620, entitled "Dual Stage Enclosure for Gas Containment," filed Jul. 17, 2002, and naming Louis J. Fioravanti as the sole inventor.

FIELD OF THE INVENTION

This application relates generally to disc drive servo track writers, and more particularly to an external servo track writer that is filled with a relatively low-density gas during the servo writing process.

BACKGROUND OF THE INVENTION

A disc drive typically includes a base to which various components of the disc drive are mounted. A top cover cooperates with the base to form a housing that defines an internal, sealed environment for the disc drive. The components include a spindle motor, which rotates one or more discs at a constant high speed, and an actuator assembly for writing information to and reading information from circular tracks on the discs. The actuator assembly includes a plurality of actuator arms extending towards the discs, with one or more flexures extending from each of the actuator arms. Mounted at the distal end of each of the flexures is a read/write head, which includes a fluid bearing slider enabling the head to fly in close proximity above the corresponding surface of the associated disc during operation of the disc drive. The fluid can be air or, alternatively, can be a different fluid such as, but not limited to, helium. When the disc drive is powered down, the heads may be moved to a landing zone at an innermost region of the discs where the fluid bearing sliders are allowed to land on the disc surface as the discs stop rotating. Alternatively, the actuator assembly may move (unload) the heads beyond the outer circumference of the discs so that the heads are supported away from the disc surface by a load/unload ramp when the drive is powered down.

Disc drives typically include a servo system for controlling the position of the heads during both seeking operations (moving from one track to another) and read/write operations where the head must precisely follow the circular track. One type of servo system is a dedicated servo system where one entire disc surface contains servo information written as dedicated tracks. The remaining disc surfaces within the drive are thus used to store data on dedicated data tracks. Another type of servo system, known as an embedded servo system, provides servo information on each of the disc surfaces embedded between data portions. Well known state estimator circuitry is used to estimate the position of the heads at such times that the heads are not located over the embedded servo information.

With both dedicated and embedded servo disc drives, servo information or "patterns" are typically recorded on the target disc by a servo-track writer assembly ("STW") during the manufacture of the disc drive. One conventional STW records servo patterns on the discs following assembly of the disc drive. In this embodiment, the STW attaches directly to a disc drive and uses the drive's own read/write heads to record the requisite servo patterns to the mounted discs. An alternative method for servo pattern recording utilizes an "external STW" apparatus having dedicated servo recording heads for recording servo patterns onto one or more discs simultaneously prior to the assembly of such discs within a disc drive. An external STW that writes servo patterns to a single disc at a time is commonly referred to as a singledisc servo track writer ("SDW"), while an external STW that writes to multiple discs at a time is referred to as a multi-disc servo track writer ("MDW").

It is crucial to provide a highly accurate positioning system with an STW to ensure accurate placement of the servo information on the discs. Specifically, an STW includes a positioning system for moving the actuator assembly and the attached heads across the disc surfaces during the servo writing procedure. The STW further includes a highly precise position detection system (often times incorporating a laser) for determining the position of the actuator assembly during the servo writing procedure. The position detection system provides correction signals to a motor within the positioning system to correct any errors in the position of the servo heads during operation of the STW.

In an effort to store more data onto existing or smaller-sized discs, the disc drive industry is continually attempting to increase the capacity of each disc or platter by increasing the track density (i.e., the number of tracks per millimeter). Increased track density requires more closely spaced, narrow tracks and therefore enhanced accuracy in the recording of servo-patterns onto the target disc surface. However, as the track density increases, it becomes increasingly likely that errors will be encountered during the servo writing process. For example, the servo writing head may experience resonance vibrations during operation, which alter the position of the head as the servo information is written. Such vibrations can lead to inaccurate servo information being written to the disc surface which, in turn, limits the ability of the disc drive to accurately position the data head over the desired data track during normal track following procedures (i.e., during normal read and write operations).

The resonance vibrations experienced by the head during the servo writing process are typically caused by the high-speed rotation of the discs within the STW. That is, the rotation of the discs within the STW (at speeds of up to 10,000 revolutions per minute or more) causes a great deal of air turbulence within the STW. This turbulence results from friction between the spinning disc surfaces and the air within the STW and represents a known phenomenon in the disc drive art. The air turbulence within a STW also impacts other components within the STW such as the actuator arms and the heads flying over the discs.

One proposed solution for reducing air turbulence while writing servo information to the discs is to partially fill the STW with helium gas during the servo writing process, thereby reducing the overall density of the gas within the disc drive. Specifically, reducing the density of the gas within the STW acts to reduce the frictional forces applied to the spinning discs, thereby reducing the drag-induced vibrations on the discs and the actuator assembly. However, a key disadvantage to this solution is that it is difficult to maintain desired helium concentrations within the STW due to the tendency of the helium gas to escape the confines of the STW during the servo writing procedure. Furthermore, because the servo writing heads must be loaded onto the discs and unloaded from the discs in an air environment (to prevent the heads from contacting the discs in a low-density helium environment), the helium gas must be flushed from the enclosed STW at the conclusion of each servo writing procedure. The difficulties associated with keeping the STW filled with helium are amplified in the case of external STWs which typically define a much larger volume, in relation to the volume of a disc drive, when the external STW is covered to provide a substantially closed environment for the helium gas. Thus, with respect to external STWs (e.g., an SDW or an MDW), each servo writing procedure requires large volumes of clean-room-quality helium gas in order to fill the relatively large interior volume of the external STW with a sufficient concentration of helium gas.

Accordingly there is a need for an improved external STW that can maintain desired concentrations of helium or other low-density gases in a cost-effective manner. The present invention provides a solution to this and other problems, and offers other advantages.

SUMMARY OF THE INVENTION

Against this backdrop the present invention has been developed. In accordance with one embodiment of the present invention, a method writes servo patterns on a disc in an external servo track writer ("STW") filled with a low-density gas to reduce drag-induced vibrations during the servo writing process. The external STW includes a spindle motor and an actuator assembly having an actuator arm and a dedicated servo writing head. The method includes loading the disc on a spindle shaft of the spindle motor and then enclosing the disc and an actuator arm within an internal enclosure. An outer cover is then closed to form an enclosed environment that surrounds the internal enclosure. Next, the spindle motor and the actuator assembly are activated to load the head on the disc. The internal enclosure is then filled with a low-density gas until a predetermined concentration and pressure of the low-density gas is attained within the internal enclosure. Next, the head is activated to write servo patterns on the disc while the internal enclosure is filled with the low-density gas. The flow of the low-density gas is then halted and the internal enclosure is opened upon the completion of the servo writing process. Purge air is then preferably added through a port in the outer cover to recover the low-density gas that is retained within the internal environment defined by the closed outer cover. Once a predetermined amount of the low-density gas has been recovered, the outer cover is opened to allow removal of the disc from the external STW. In one embodiment, the predetermined amount of recovered low-density gas is at least 90 percent of the gas used during the servo writing procedure.

The external STW may be used with conventional heads so that the head is loaded on the disc and unloaded from the disc in an air environment. Alternatively, the STW may be used with specially designed helium-compatible heads so that the internal enclosure is filled with the low-density gas prior to loading the head on the disc. Similarly, the head would then preferably be unloaded from the disc in a low-density gas environment prior to opening the internal enclosure. Of course, the helium-compatible heads could also be loaded and unloaded in an air environment to provide an extra measure of lift during the crucial loading and unloading processes. Additionally, the internal enclosure may be overfilled with the low-density gas to increase the pressure of the gas above atmospheric pressure so that conventional air-compatible servo writing heads may be both loaded on the disc and unloaded from the disc in a low-density gas environment.

Another embodiment of the present invention is an external servo track writer ("STW") for writing servo patterns on a disc in a low-density gas environment. The external STW includes a base supporting a spindle motor for rotating the disc and an actuator assembly having an actuator arm and a dedicated servo writing head for writing servo patterns on the rotating disc. An internal enclosure is movable between an open position for loading the disc on the spindle motor and a closed position substantially surrounding the disc and the actuator arm and servo writing head of the actuator assembly. An outer cover is movable between an open position and a closed position forming a substantially closed internal environment with the base of the STW. The outer cover fully encloses and contains the internal enclosure within the internal environment. A source of low-density gas connected to a port on the internal enclosure directs the low-density gas into the internal enclosure prior to writing the servo patterns on the disc. An outflow port attached to the outer cover allows recovery of low-density gas from the internal enclosure. The outer cover also preferably includes a purge port to introduce purge air into the internal environment of the STW to assist with the recovery of the low-density gas.

The internal enclosure preferably comprises a fixed portion connected to the actuator assembly and a pivotable portion connected adjacent the spindle motor. The pivotable portion is moveable between an open position for freely receiving a disc on the spindle motor and a closed position for engaging the fixed portion of the internal enclosure. Both the fixed portion and the pivotable portion of the internal enclosure preferably include a cut-out region for receiving a portion of a spindle shaft of the spindle motor when the internal enclosure is in the closed position.

The present invention can further be implemented as an external servo track writer ("STW") having a spindle motor and an actuator assembly for writing servo patterns on a disc in a low-density gas environment. The external STW includes a first enclosure surrounding the disc and the actuator assembly wherein the first enclosure is filled with the low-density gas prior to writing the servo patterns on the disc. The STW also includes means for recovering low-density gas that leaks from the first enclosure during the servo writing process. The first enclosure preferably surrounds substantially only the disc and an actuator arm of the actuator assembly, while the means for recovering the low-density gas leaking from the first enclosure preferably comprises a second enclosure that surrounds substantially the first enclosure.

These and various other features as well as advantages which characterize the present invention will be apparent from a reading of the following detailed description and a review of the associated drawings.

DETAILED DESCRIPTION

Figure 1:
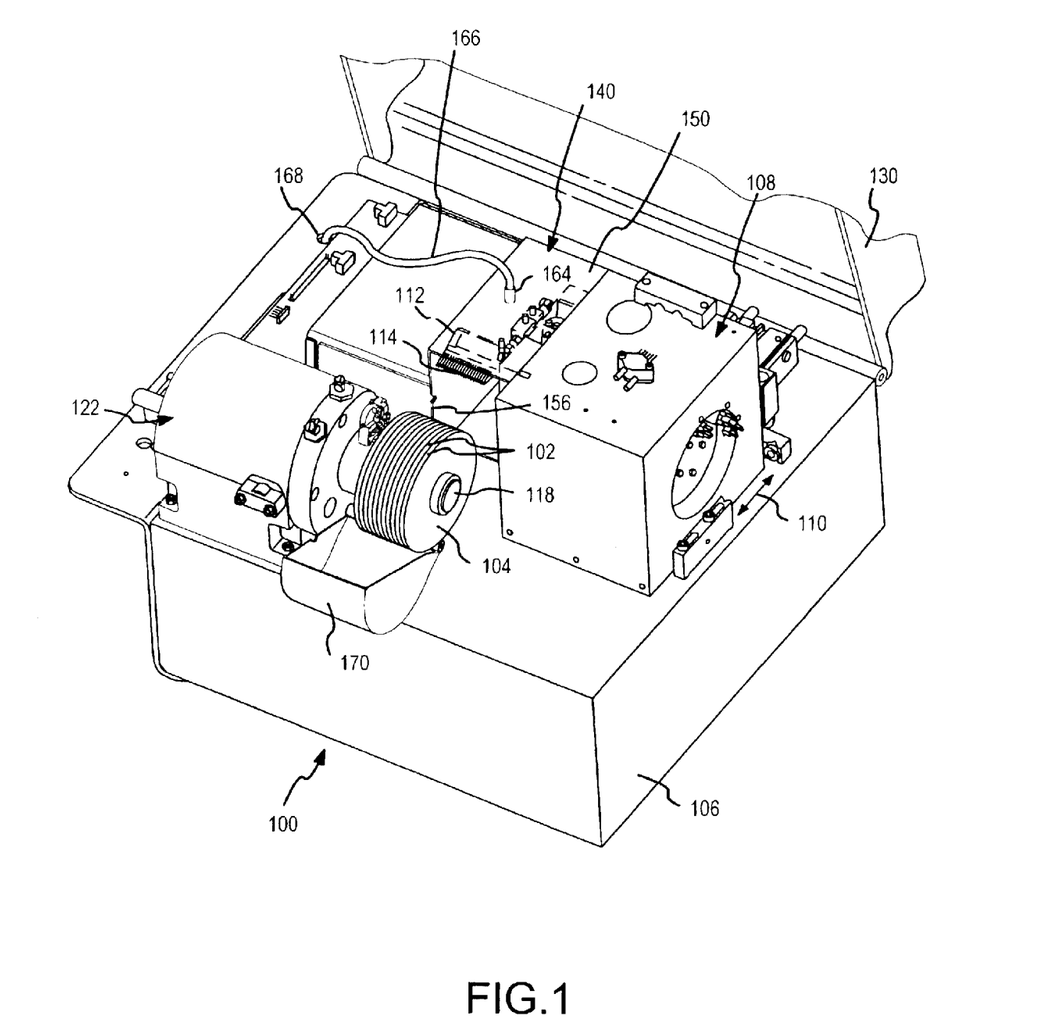
FIG. 1 is a perspective view of a multi-disc servo track writer ("MDW") in accordance with a preferred embodiment of the present invention illustrating a disc pack attached for rotation on a spindle motor and an actuator assembly that moves relative to the disc pack, and wherein the MDW incorporates a dual stage enclosure for containing low-density gas during the servo writing procedure.

A multi-disc servo track writer ("MDW") 100 capable of writing servo patterns to a plurality of discs 102 in a disc pack 104 is shown in FIG. 1. The MDW 100 sits upon a substantially immobile and horizontally positioned platform or granite slab 106. An actuator assembly 108 is connected to the platform 106 via a slide mechanism for lateral movement (as indicated by arrow 110) over the platform 106 between a servo writing position (FIG. 3) and a disc loading and unloading position as shown in FIG. 1. The actuator assembly 108 includes an E-block 112 having a plurality of actuator arms 114 for positioning a plurality of servo recording heads 116 (FIG. 3) to write servo patterns onto each of the discs 102 of the disc pack 104. The discs 102 of the disc pack 104 are preferably secured in a substantially vertical plane against a hub 118 of a spindle shaft 120 (FIG. 2) that is rotatable substantially in a horizontal plane and that is detachable from a spindle motor 122. In this manner, the shaft 120, the hub 118 and the disc pack 104 can be detached from the spindle motor 122 to ease the process of loading and unloading the discs 102 from the spindle shaft 120. It is understood that the MDW 100 could also comprise a single-disc servo track writer ("SDW") that is adapted to write servo patterns to a single disc 102 at a time.

Once the discs 102 have been loaded for rotation by the spindle motor 122, the actuator assembly 108 is preferably moved laterally along the platform 106 (in the direction of arrow 110) toward the vertically aligned discs 102. A comb (not shown in FIG. 1) is preferably used to maintain proper separation between the heads 116 (FIG. 3) at the ends of the actuator arms 114 so that the actuator arms 114 and the disc pack 104 may merge without unintentional contact between the heads 116 and the discs 102. Once the actuator assembly 108 is locked into the servo writing position so that the arms 114 are positioned within the gaps between adjacent discs 102, the comb (not shown) is rotated away from the E-block 112 to allow the heads 116 to engage their respective discs as a result of a bias force provided by flexures at the ends of each actuator arm 114. Of course, the servo writing heads 116 do not make physical contact with the respective disc surfaces since the spindle motor 122 is activated to spin the discs 102 at a predetermined rate prior to disengaging the comb, thereby allowing the heads 116 to "fly" over their respective disc surfaces.

In previous versions of the MDW, the heads fly on an air bearing a predetermined height above the surface of the discs. However, such prior MDWs suffer from drag-induced vibrations due to aerodynamic drag forces experienced by the plurality of discs rotating at high speeds within the MDW. Previous attempts to reduce the aerodynamic drag force on the discs have included the use of a cover 130 (FIG. 1) extending over the entirety of the platform 106 to allow for the introduction of a low-density gas (such as helium) within the confines of the MDW 100 during the servo writing process. The use of helium or other low-density gases reduces the level of turbulence experienced during the servo writing procedure and allows for greater accuracy in the recording of servo patterns onto the target discs 102.

While the use of helium-filled MDWs have led to greater track density on discs 102, it has been found that excessive amounts of helium (or other low-density gases) are needed to fill the entire volume of the MDW 100 with a sufficiently high concentration of the gas (e.g., 99 percent or greater). This is due to the large interior volume of the MDW 100 that is created when the cover 130 is closed. Thus, the present invention pertains to a dual stage enclosure that comprises not only the outer cover 130 but also an internal enclosure 140 that encompasses substantially only the disc pack 104 (or a single disc 102 in the case of an SDW) and the operative portions of the actuator assembly 108, such as the actuator arms 114 and the heads 116 (FIG. 3), during the servo writing process.

Specifically, the internal enclosure 140 is designed to encompass a minimum volume within the larger volume of the MDW 100 so that a smaller amount of the low-density gas may be used to fill the internal enclosure 140. The use of a relatively small internal enclosure 140 also allows the low-density gas to reach a minimum concentration (e.g., 99 percent) within the enclosure 140 much more quickly than was previously required to fill the entire volume of the MDW 100 defined by the outer cover 130. For example, the present invention may reduce the duration of the servo writing procedure by more than a minute, which represents a valuable time savings within the overall disc drive manufacturing process. Thus, the use of the internal enclosure 140 represents a savings in both time and the amount of gas required to envelop the discs 102 and the heads 116 prior to writing the servo patterns.

As described in greater detail below, the internal enclosure 140 is used in conjunction with the outer cover 130 to enable recovery of the low-density gas used to fill the internal enclosure 140. Specifically, due to the nature of the MDW 100 and the fact that a separate disc pack 104 must be loaded within and then removed from the MDW after each servo writing 5 procedure, it is preferred that the internal enclosure 140 not be aggressively sealed around the disc pack 104 and the actuator arms 114. Rather, as the commercially valuable low-density gas escapes from the internal enclosure 140 during the servo writing procedure, the outer cover 130 is preferably employed to contain the leaking gas. Additionally, at the conclusion of the procedure, when the internal enclosure 140 is opened, the remaining low-density gas within the internal enclosure 140 will be contained by the outer cover 130. Known gas recovery techniques may then be used to recover a significant portion of the helium (or other low-density gas) before opening the outer cover 130 and removing the disc pack 104 (or the single disc 102 in the case of an SDW).

Figure 2:
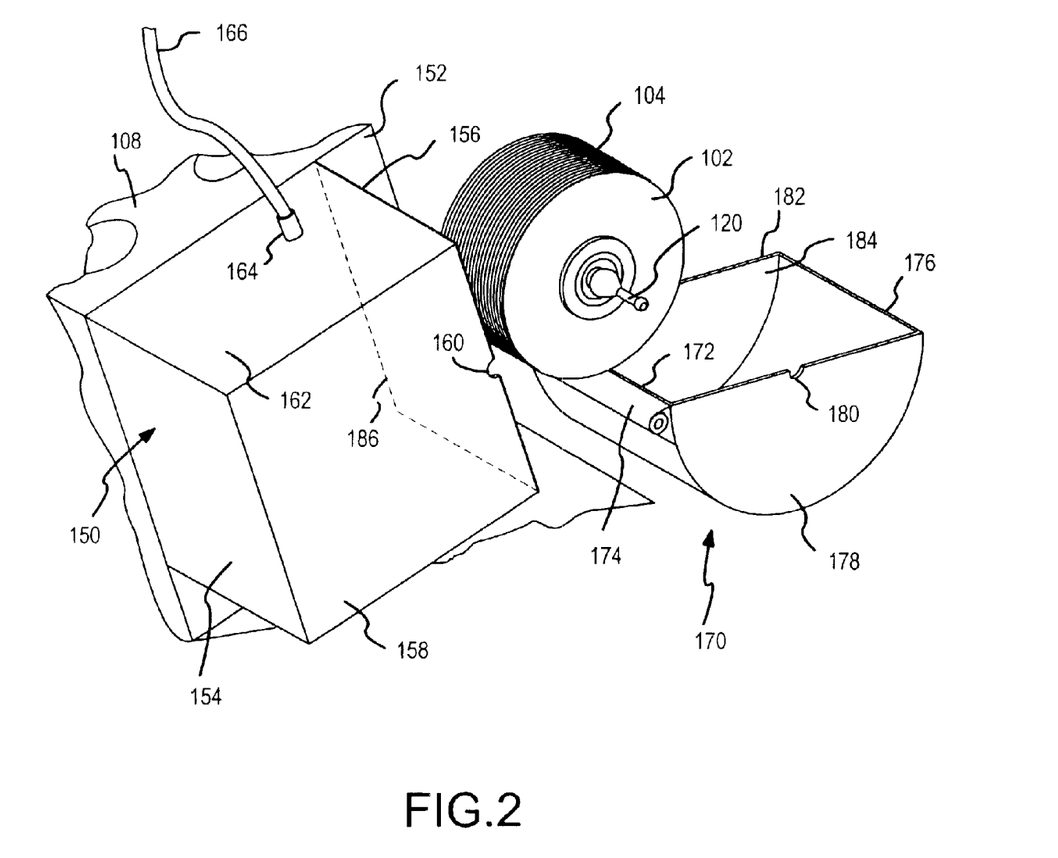
FIG. 2 is an enlarged perspective view of the MDW of FIG. 1 taken from an opposite perspective where the spindle motor has been removed to better illustrate the component parts of an internal enclosure of the dual stage gas enclosure.
Figure 3:
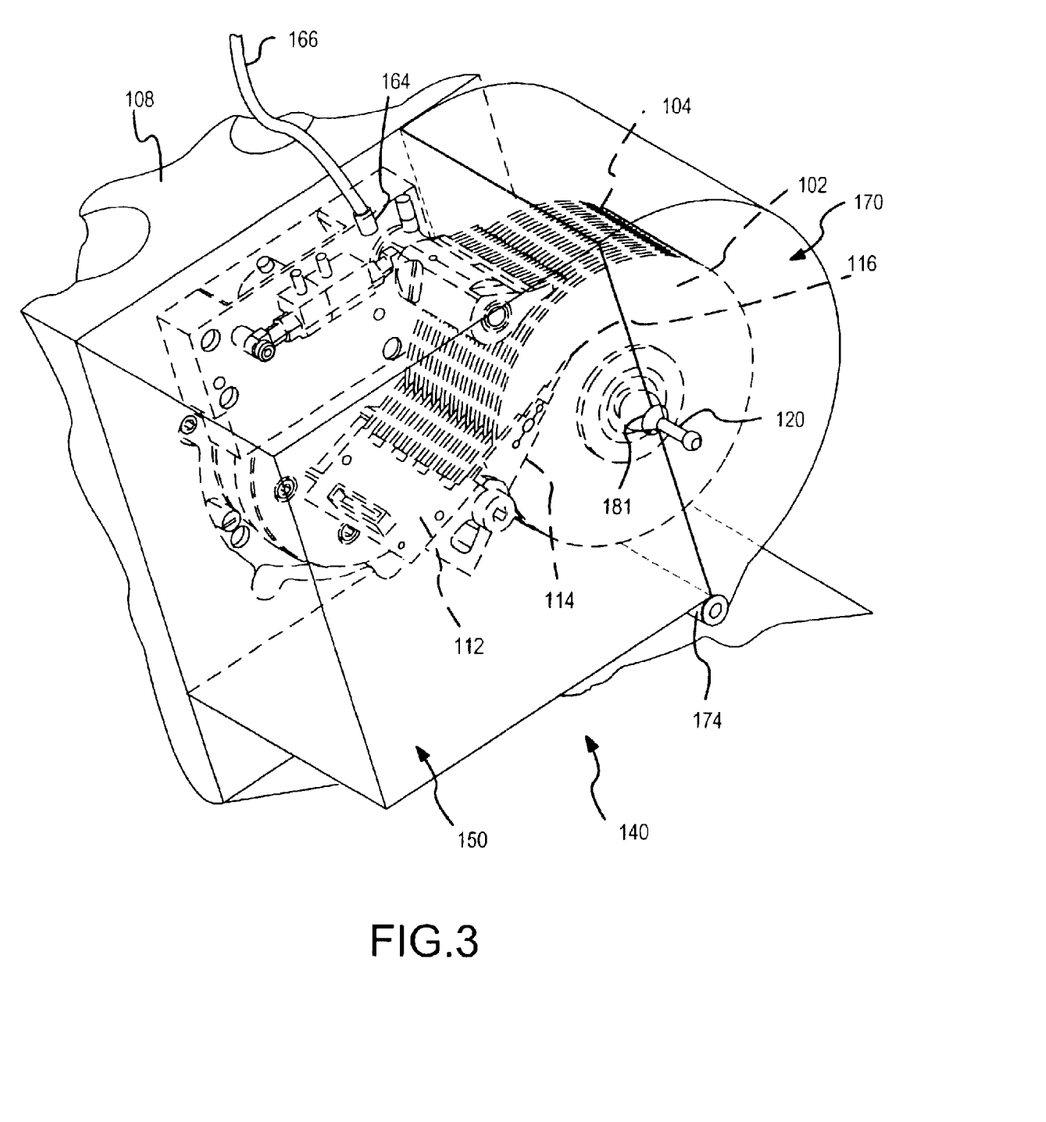
FIG. 3 is an enlarged perspective view of the MDW of FIG. 2 illustrating the internal enclosure of the dual stage gas enclosure in an operative position sealed around the disc pack and the actuator arms of the MDW.

With reference to FIGS. 1–3, a preferred embodiment of the internal enclosure 140 is described, although it is understood that many different alternative designs may be employed provided that the internal enclosure 140 encompasses a significantly smaller volume than that enclosed by the outer cover 130. As best shown in FIG. 1, the internal enclosure 140 preferably comprises two separate sub-enclosures that must be sealed together to define the internal environment of the enclosure 140. First, a fixed portion 150 of the internal enclosure 140 preferably extends from a vertical face 152 (FIG. 2) of the actuator assembly 108 to surround the E-block 112 and the actuator arms 114. The fixed portion 150 is preferably rectangular in shape having a first closed end 154 (FIG. 2) and a second open end 156 adjacent the ends of the actuator arms 114 that contain the servo writing heads 116. The dimensions of the fixed portion 150 are established such that the open end 156 substantially encompasses half of the entire disc pack 104 when the actuator assembly 108 is moved into servo writing position (FIG. 3). An outer face 158 of the fixed portion 150 preferably includes a semi-circular cut-out region 160 along an edge of the face 158 adjacent the open end 156 of the fixed portion, wherein the cut-out region preferably receives a portion of the spindle shaft 120 as described below. Additionally, a top face 162 of the fixed portion 150 preferably includes a gas inlet port 164 connected to a gas line 166 which, in turn, is connected to a source (not shown) of low-density gas, such as helium. As shown in FIG. 1, the gas line 166 preferably extends across the interior of the MDW 100 and exits through an opening 168 formed in the base of the MDW 100 where it connects to the source of gas (not shown). In this manner, the gas line 166 is not required to extend through the outer cover 130.

In addition to the fixed portion 150, the internal enclosure 140 further preferably comprises a pivotable portion 170 that may be rotated between an open position, as shown in FIGS. 1 and 2, and a closed position as shown in FIG. 3. In the closed position, the pivotable portion 170 preferably encompasses the remainder of the disc pack 104 that is not encompassed by the fixed portion 150 (as described above). In a preferred embodiment, the pivotable portion 170 has a semi-cylindrical shape and includes a first edge 172 that is fixed to a pivot assembly 174 positioned beneath the spindle shaft 120 on the MDW 100. Connected in this manner, the pivot assembly 174 may be operated to move the pivotable portion 170 between the open position (to permit loading of the spindle shaft 120 and the disc pack 104 within the spindle motor 122) and the closed position where a second edge 176 is positioned above the spindleshaft 120.

The pivotable portion 170 includes an outer face 178 that is aligned with the outer face 158 of the fixed portion 150 when the pivotable portion 170 of the internal enclosure 140 is pivoted to the closed position. The outer face 178 preferably includes a semi-circular cut-out region 180 along an edge of the face 178 to receive a portion of the spindle shaft 120 when the pivotable portion 170 is closed. Thus, the two cut-out regions 160 and 180 combine to form a circular hole 181 (FIG. 3) to allow the spindle shaft 120 to pass through the internal enclosure 140 once the two portions 150 and 170 of the internal enclosure are abuttingly engaged.

FIG. 3 illustrates the manner in which the fixed portion 150 and the pivotable portion 170 are engaged against one another to form the internal enclosure 140. Specifically, each of the edges along the open end 156 of the fixed portion 150 abuttingly engages an opposite edge of the pivotable portion 170 once the actuator assembly 108 has been moved into its operative position and the pivotable portion 170 has been rotated to the closed position. A sealing member 186 extending along the perimeter of the open end 156 of the fixed portion 150 provides a sealing engagement for edge 182 of pivotable portion 170 upon the abutting engagement of the portions 140 and 170.

As shown in FIG. 3, the actuator arms 114 preferably engage the discs 102 of the disc pack 104 once the fixed portion 150 and the pivotable portion 170 of the internal enclosure 140 are sealed and a low-density gas (such as helium) has filled the enclosure 140 through the gas line 166. The precise order in which the low-density gas fills the enclosure 140 and the actuator arms 114 engage the discs 102 depends on the type of servo writing heads 116 used with the MDW 100, as well as the pressure of the low-density gas within the enclosure 140. For example, most servo writing heads 116 are adapted for operation within an air environment. Thus, when such air-compatible heads are used, it is preferable to first load the heads 116 onto the spinning discs 102 before filling the enclosure 140 with the low-density gas. This order is preferred because air provides a relatively greater lifting force than does helium (or other low-density gases) at atmospheric pressure and thus helps to prevent unintentional contact between the heads 116 and the discs 102 during the crucial head loading procedure (i.e., when the E-block 112 moves the arms 114 between the adjacent discs 102 and the comb is retracted from the arms 114 to allow the heads to "fly" over the spinning discs). Once the heads 116 have been loaded onto their respective discs 102, the enclosure 140 is then preferably filled with the low-density gas. Since the heads 116 are nominally designed to "fly" in an air environment, the use of the low-density gas (e.g., helium) in the internal enclosure 140 tends to tends to reduce the amount of lift experienced by the heads 116 so that the heads fly at a lower height above the surface of the discs 102. This reduced "fly height," combined with the associated reduction in turbulence, allows the servo patterns to be written to the discs 102 in a more controlled manner resulting in greater track density in comparison to prior external STWs.

When the low-density gas is initially directed into the internal enclosure 140 by the gas line 166, the existing air within the enclosure 140 must be expelled in order to achieve a desired concentration of the gas within the enclosure 140 (e.g., 99 percent or greater). Although the internal enclosure 140 is substantially sealed by the contact between the fixed portion 150 and the pivotable portion 170, there are openings within the enclosure 140 (such as the circular opening 181 around the spindle shaft 120 formed by the opposing cut-out regions 160 and 180) that permit the air to escape the enclosure 140. That is, due to the dual stage enclosures 140 and 130 of the MDW 100, it is not necessary to aggressively seal the internal enclosure 140 to prevent gas from leaking from the enclosure 140. However, the presence of the opening 181 (as well as any other leaks in the enclosure 140) requires a steady stream of replacement gas to flow through the line 166 during the servo writing process in order to maintain a desired concentration and pressure of the low-density gas within the enclosure 140. Upon the conclusion of the servo writing procedure, the flow of low-density gas through line 166 is preferably terminated and the pivotable portion 170 is partially opened to increase the amount of air surrounding the discs 102. In this manner, the heads 116 can once again be unloaded from the spinning discs 102 substantially in an air environment to further protect the delicate disc surfaces.

As an alternative to loading and unloading the servo writing heads in an air environment, the actuator assembly 108 may use specially designed servo writing heads 116 that are adapted for use in a helium environment. When using such helium-compatible heads 116, the enclosure 140 can be sealed and filled with the low-density gas prior to spinning the discs 102 up to speed and pivoting the E-block 112 into position to load the actuator arms 114 within the disc pack 104. Similarly, upon the conclusion of the servo writing process, the heads 116 may be unloaded or removed from the disc pack before spinning down the discs 102 and opening the enclosure 140. Alternatively, the helium-compatible heads 116 may be loaded in an air environment to save additional time (i.e., the heads may be loaded as the helium gas is pumped into the internal enclosure 140 since the air within the enclosure will provide an extra amount of lift for the helium-compatible heads during the loading process). Thus, the use of helium-compatible heads 116 may result in a further time savings over the course of the entire servo writing process.

In yet a further embodiment, it may be desired to load and unload conventional air-compatible heads in a helium environment. That is, the use of a substantially sealed enclosure 140 provides the opportunity to increase the pressure of the helium (or other low-density gas) within the enclosure 140 to a level greater than atmospheric pressure. Maintaining a greater-than-atmospheric pressure of the low-density gas within the enclosure 140 provides the opportunity to use conventional servo writing heads 116 while allowing the enclosure 140 to be filled with the low-density gas prior to spinning up the disc pack 104 and loading the heads on the discs 102. Specifically, by pressurizing the low-density gas above atmospheric pressure, the gas will provide a lift force on the heads 116 that is substantially equivalent to that provided by air at atmospheric pressure. Thus, the pressure of the gas can be temporarily increased above atmospheric pressure during the crucial head loading and unloading procedures at the beginning and end of the servo writing process. However, once the heads 116 are loaded onto the discs, the pressure of the low-density gas is preferably reduced to atmospheric pressure during the servo writing procedure.

As noted above, the enclosure 140 is not aggressively sealed and thus the flow of gas through the line 166 must be increased above a basic maintenance level to compensate for the gas lost through openings in the enclosure 140 (such as the hole 181) and thereby maintain the gas pressure above the atmospheric pressure outside of the enclosure 140. Specifically, when attempting to load conventional heads 116 on the discs 102 in a helium environment, it is desirable to direct a relatively high flow rate of the low-density gas through the line 166 to initially pressurize the internal enclosure 140 above atmospheric pressure. Once the heads 116 have been loaded on the discs 102, the flow rate of gas 166 can be decreased to a maintenance level that is sufficient to maintain the desired concentration of the gas (e.g., 99 percent) at atmospheric pressure within the internal enclosure 140.

Figure 4:
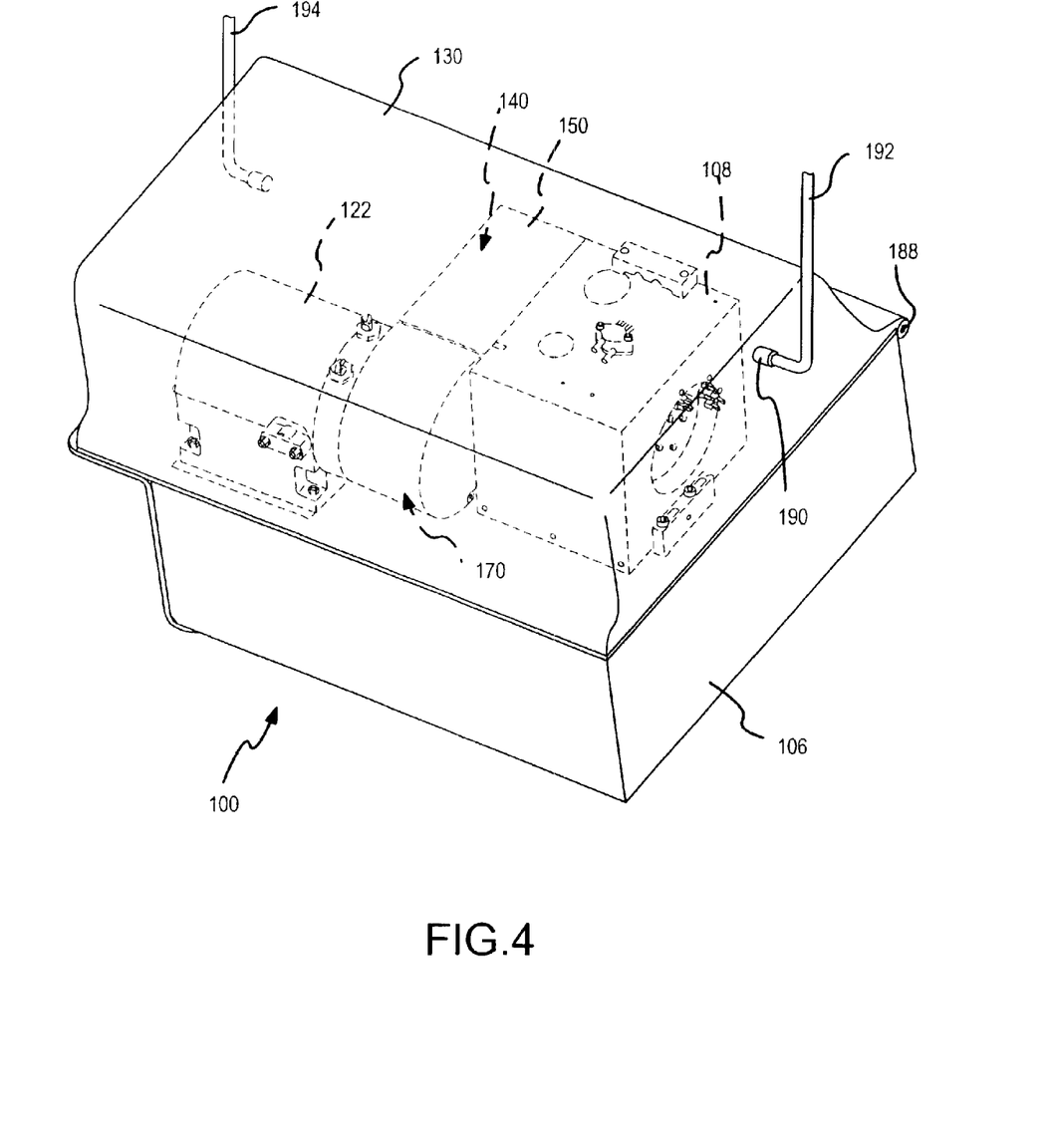
FIG. 4 is a perspective view of the MDW of FIG. 1 illustrating an outer cover of the dual stage gas enclosure and a purge line for filling the MDW with air at the conclusion of the servo writing procedure, as well as an outflow line for recovering the low-density gas.

During the course of the servo writing process, the commercially valuable low-density gas (e.g., helium) leaks from the internal enclosure 140 as described above. However, the present invention employs a second-stage enclosure (the outer cover 130) to substantially contain the low-density gas that leaks from the internal enclosure 140. Specifically, once the actuator assembly 108 and the fixed portion 150 have been moved into their operative position, and the pivotable portion 170 of the internal enclosure 140 has been pivoted closed, the outer cover 130 is preferably lowered into position to substantially seal the entirety of the MDW 100, as shown in FIG. 4. While the outer cover 130 is shown attached to a pivot assembly 188 along a rear edge of the MDW 100, alternative well-known means for opening and closing the cover 130 may also be used.

The outer cover 130 is used to contain and recycle a substantial portion of the low-density gas used during the servo writing procedure. Specifically, as the low-density gas escapes from the internal enclosure 140, the gas mixes with the air trapped by the outer cover 130 until the pressure within the sealed MDW 100 rises above atmospheric pressure. The increase in pressure causes the air/helium mixture to travel through an outflow port 190 attached to the outer cover 130. A recycle line 192 connected to the outflow port 190 directs the air/helium mixture to a recycling center (not shown) where the helium (or other low-density gas) is separated from the air and reclaimed for further use. Additionally, when the flow of helium through the line 166 is terminated and the internal enclosure 140 is opened at the conclusion of the servo writing process, a source of air (not shown) is preferably connected to line 194 in order to flush the remaining helium from the interior of the sealed MDW 100 prior to opening the outer cover 130. That is, purge air is directed through the line 194 for a predetermined period of time in order to flush the remaining helium (or other low-density gas) from the enclosed MDW 100 through the line 192. While the amount of helium recovered depends on the time that the purge air is allowed to run, it has been found that approximately 90 percent of the helium (or other low-density gas) may be recovered by operating the purge air for approximately one minute before opening the outer cover 130.

Figure 5:
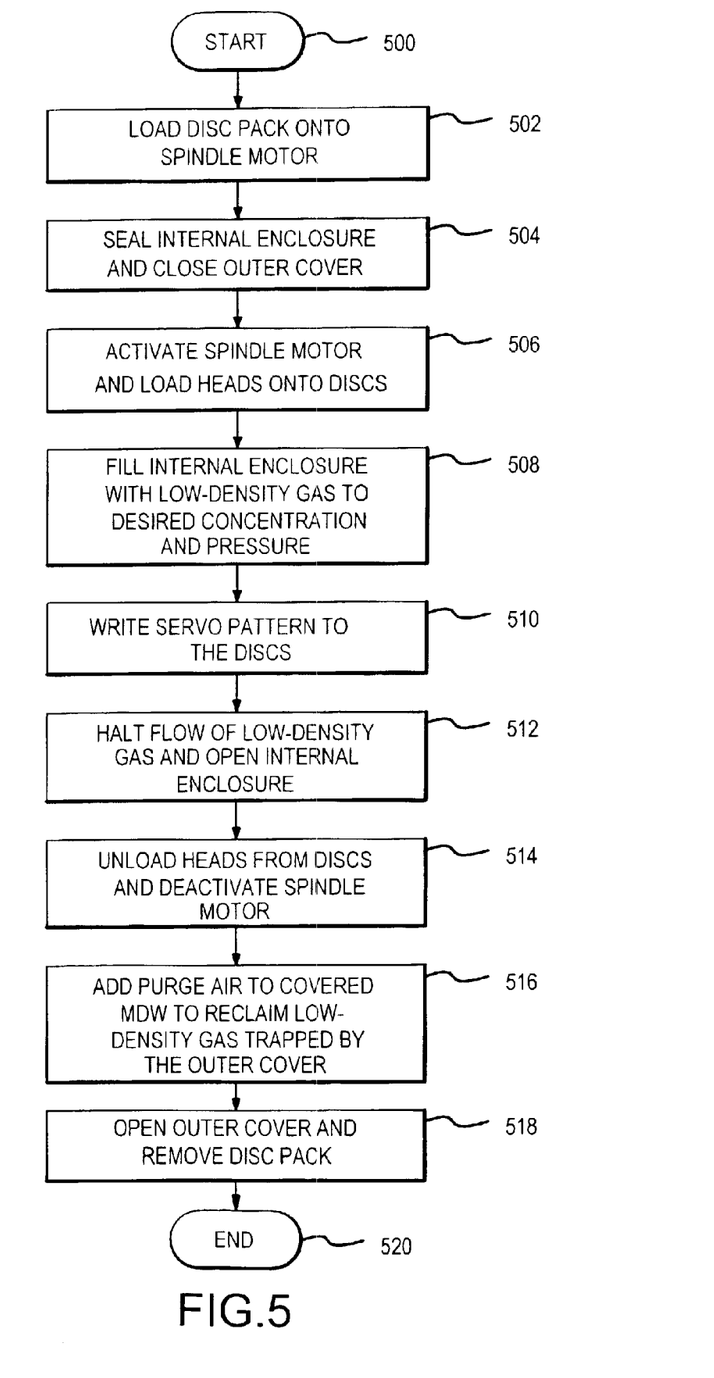
FIG. 5 is a flow chart of a general method of writing servo information on discs using a dual stage enclosure with an MDW in accordance with a preferred embodiment of the present invention.

Referring now to FIG. 5, a preferred method of writing servo patterns to the discs 102 of a disc pack 104 within an MDW 100 (or an SDW) having a dual stage gas enclosure is disclosed. The method starts at 500 and proceeds to operation 502 where the disc pack 104 (or single disc 102 in the case of an SDW) is loaded onto the spindle motor 122. Next, in operation 504, the internal enclosure 140 is closed (i.e., the actuator assembly 108 and the fixed portion 150 are moved into position and the pivotable portion 170 is pivoted to the closed position) and the outer cover 130 is also closed to substantially seal the MDW 100 as shown in FIG. 4.

In the next step 506, the spindle motor 122 is activated to spin up the discs 102 while the E-block 112 pivots the actuator arms 114 into position to load the heads 116 on the discs 102 in an air environment. The method then continues at operation 508 where the low-density gas (such as helium) is directed through the gas line 166 into the volume of the internal enclosure 140. Once a desired concentration and pressure of the low-density gas is attained within the enclosure 140, the method continues at step 510 where the process of writing the servo information to the discs 102 is initiated. During the servo writing step 510, an additional or "maintenance" flow of the low-density gas is continually directed into the enclosure 140 through the line 166 to make up for any leakage through openings in the enclosure 140. Once the servo writing process is complete, the method continues at operation 512 where the flow of the low-density gas is halted and the internal enclosure 140 is opened to readmit a substantially air environment around the spinning discs 102 and the heads 116. The method then continues at operation 514 where the heads 116 are unloaded from the discs in the air environment and the discs are spun down by deactivating the spindle motor 122.

While above steps 506 through 514 have been described assuming that conventional (air-calibrated) heads 116 are used, it is possible that special (helium-calibrated) heads 116 may be used with the MDW 100. In this case, the order of steps 506 and 508 would preferably be reversed so that the enclosure 140 is filled with helium (or another low-density gas) prior to the step of spinning up the discs 102 and loading the heads 116. Similarly, steps 512 and 514 would also preferably be reversed so that the heads 116 would be unloaded from the spinning discs 102 prior to halting the flow of the low-density gas and opening the enclosure 140. Alternatively, the helium-calibrated heads 116 could be loaded and/or unloaded in an air environment since the extra lift provided by the air atmosphere may prove beneficial during the loading and unloading process and time may be saved by loading the helium-calibrated heads 116 on the discs 102 while the low-density gas is filling the enclosure 140.

As a further alternative to using special (helium-calibrated) heads 116, the present invention further allows for the use of conventional (air-calibrated) heads 116 while still loading and unloading the heads in a helium (or other low-density gas) environment. In this case, not only would steps 506 and 508 be reversed, but step 508 would further entail filling the enclosure 140 to a pressure greater than atmospheric pressure so that the heads 116 could be loaded without risk of inadvertently contacting the discs 102. Similarly, step 510 would also entail reducing the pressure of the low-density gas within the internal enclosure 140 prior to writing the servo patterns to the discs 102. Finally, while steps 512 and 514 would again be reversed as described above, step 514 would further entail increasing the pressure of the low-density gas (i.e., increasing the flow rate of the gas into the enclosure 140) prior to unloading the heads 116 from the discs 102.

Regardless of the order in which the internal enclosure 140 is filled and the heads 116 are loaded onto the discs 102 (i.e., the order of steps 506 and 508 as well as steps 512 and 514), upon the conclusion of the servo writing procedure the internal enclosure 140 is opened and the low-density gas within the enclosure 140 is allowed to flow into the outer cover 130. The method then continues at operation 516 where purge air is directed into the enclosed volume of the MDW 100 through the line 194 to force the helium (or other low-density gas) from the port 190. As described above, the mixture of purge air and the low-density gas is then directed through the line 192 to a recycling apparatus for separating the low-density gas from the air. The method then continues at operation 518 where the outer cover 130 is opened to allow removal of the disc pack 104 (or the single disc 102 in the case of an SDW). The method then ends at 520.

The dual stage gas enclosure of the present invention, comprising internal enclosure 140 and outer cover 130, provides many benefits over helium-filled external STWs that utilize only a single stage gas enclosure. First, the dual stage enclosure uses a much smaller volume of helium (or another low-density gas) to complete the servo writing procedure since the high concentration of helium is limited to the relatively small volume of the internal enclosure 140. Also, due to the relatively small volume of the internal enclosure 140, the flow of helium gas may be adjusted to temporarily raise the pressure of the gas within the enclosure 140, thereby allowing the heads 116 to be loaded onto and unloaded from the discs 102 in an atmosphere that more closely simulates the air-filled atmosphere that the heads 116 were designed to operate in. The ability to adjust the pressure in this manner provides an extra margin of safety when loading and unloading the heads, while still allowing the pressure to be lowered back to atmospheric pressure (with its attendant reduction in turbulence) during the actual servo writing process. Furthermore, the use of the outer cover 130 allows a substantial portion of the low-density gas (e.g., 90 percent) to be recovered for future use. Finally, the use of a dual stage enclosure allows for a less aggressive sealing system for each of the enclosures since the gas that leaks from the internal enclosure 140 will likely be recovered by the outer cover 130.

Described in another way, a method in accordance with an exemplary preferred embodiment of the present invention writes servo patterns on a disc (such as 102) in an external servo track writer ("STW") (such as 100) including a spindle motor (such as 122) and an actuator assembly (such as 108) having an actuator arm (such as 114) and a dedicated servo writing head (such as 116). The method includes loading the disc (such as 102) on a spindle shaft (such as 120) of the spindle motor (such as in operation 502). The disc (such as 102) and the actuator arm (such as 114) are then enclosed within an internal enclosure (such as 140), while an outer cover (such as 130) is also closed (such as in operation 504) to form an enclosed environment that surrounds the internal enclosure (such as 140). Next, the spindle motor (such as 122) and the actuator assembly (such as 108) are activated (such as in operation 506) to load the head (such as 116) on the disc (such as 102). The internal enclosure (such as 140) is then filled with a low-density gas (such as in operation 508) until a predetermined concentration and pressure of the low-density gas is attained within the internal enclosure. Next, the head (such as 116) is activated (such as in operation 510) to write servo patterns on the disc (such as 102) while the internal enclosure (such as 140) is filled with the low-density gas. The flow of the low-density gas is then halted and the internal enclosure (such as 140) is opened (such as in operation 512) upon the completion of the servo writing process. Purge air is then added (such as in operation 516) through a port (such as 194) in the outer cover (such as 130) to recover the low-density gas from the internal environment defined by the closed outer cover (such as 130). Once a predetermined amount of the low-density gas has been recovered, the outer cover (such as 130) is opened (such as in operation 518) to allow removal of the disc (such as 102) from the STW (such as 100). In one embodiment, the predetermined amount of recovered low-density gas is at least 90 percent of the gas used during the servo writing procedure.

The external STW (such as 100) may be used with conventional heads (such as 116) so that the activating step (such as operation 506) is performed prior to the filling step (such as operation 508), and so that the head (such as 116) is loaded on the disc (such as 102) in an air environment. Similarly, the step (such as in operation 512) of opening the internal enclosure (such as 140) may further comprise unloading the head (such as 116) from the disc (such as 102) after opening the internal enclosure (such as 140) so that the head is unloaded in an air environment.

Alternatively, the external STW (such as 100) may be used with specially designed helium compatible heads so that the activating step (such as operation 506) is performed after the filling step (such as operation 508), and so that the internal enclosure (such as 140) is filled with the low-density gas prior to loading the head (such as 116) on the disc (such as 102). Similarly, the step of writing the servo patterns (such as in operation 510) further comprises unloading the head (such as 116) from the disc (such as 102) once the servo patterns have been written to the disc and prior to the step (such as in operation 512) of opening the internal enclosure (such as 140) so that the head (such as 116) is unloaded from the disc (such as 102) in a low-density gas environment.

Another embodiment of the present invention may be described as an external servo track writer ("STW") (such as 100) for writing servo patterns on a disc (such as 102) in a low-density gas environment. The external STW (such as 100) includes a base (such as 106) supporting a spindle motor (such as 122) for rotating the disc (such as 102) and an actuator assembly (such as 108) having an actuator arm (such as 114) and a dedicated servo writing head (such as 116) for writing servo patterns on the rotating disc (such as 102). An internal enclosure (such as 140) is movable between an open position for loading the disc (such as 102) on the spindle motor (such as 122) and a closed position substantially surrounding the disc (such as 102) and the actuator arm (such as 114) and servo writing head (such as 116) of the actuator assembly (such as 108). An outer cover (such as 130) is movable between an open position and a closed position forming a substantially closed internal environment with the base (such as 106). The outer cover (such as 130) fully encloses and contains the internal enclosure (such as 140) within the internal environment of the STW (such as 100). A source of low-density gas connected to a port (such as 164) on the internal enclosure (such as 140) directs the low-density gas into the internal enclosure (such as 140) prior to writing the servo patterns on the disc (such as 102). An outflow port (such as 190) attached to the outer cover (such as 130) allows recovery of low-density gas from the internal enclosure (such as 140). The outer cover (such as 130) also preferably includes a purge port (such as 194) to introduce purge air into the internal environment to assist with the recovery of the low-density gas.

The internal enclosure (such as 140) preferably comprises a fixed portion (such as 150) connected to the actuator assembly (such as 108) and a pivotable portion (such as 170) connected adjacent the spindle motor (such as 122). The pivotable portion (such as 170) is moveable between an open position for freely receiving a disc (such as 102) on the spindle motor (such as 122) and a closed position for engaging the fixed portion (such as 150) of the internal enclosure (such as 140). Both the fixed portion (such as 150) and the pivotable portion (such as 170) of the internal enclosure (such as 140) preferably include a cut-out region (such as 160 and 180, respectively) for receiving a portion of a spindle shaft (such as 120) of the spindle motor (such as 122) when the internal enclosure (such as 140) is in the closed position.

Yet another embodiment of the present invention may be described as an external servo track writer ("STW") (such as 100) having a spindle motor (such as 122) and an actuator assembly (such as 108) for writing servo patterns on a disc (such as 102) in a low-density gas environment. The external STW (such as 100) includes a first enclosure (such as 140) surrounding the disc (such as 102) and the actuator assembly (such as 108) wherein the first enclosure (such as 140) is filled with the low-density gas prior to writing the servo patterns on the disc (such as 102). The external STW (such as 100) also includes means (such as 130) for recovering low-density gas that leaks from the first enclosure (such as 140) during the servo writing process. The first enclosure (such as 140) preferably surrounds substantially only the disc (such as 102) and an actuator arm (such as 114) of the actuator assembly (such as 108), while the means for recovering the low-density gas leaking from the first enclosure (such as 140) preferably comprises a second enclosure (such as 130) that substantially surrounds the first enclosure (such as 140).

It will be clear that the present invention is well adapted to attain the ends and advantages mentioned as well as those inherent therein. While embodiments have been described for purposes of this disclosure, various changes and modifications may be made which are well within the scope of the present invention. For example, while the low-density gas preferably comprises helium, alternative low-density gases may be used provided such gases are purified for use within a clean room environment. Additionally, while specific embodiments of the MDW 100, the internal enclosure 140 and the outer cover 130 have been described, the present invention is not limited to any specific servo writer design or configuration for the two enclosures 140 and 130. Rather, the invention may work with many different dual stage enclosures provided that a first-stage (internal) enclosure is sufficiently small to cover substantially only the disc pack 104 and the E-block 112 and actuator arms 114 of the actuator assembly 108, while the second-stage (outer) cover surrounds the first-state enclosure to capture gas that leaks from the first-stage enclosure. Additionally, while the above invention is described with reference to an MDW 100, it is understood that the dual stage enclosure could be used with a single-disc writer ("SDW") that is similar in design to the MDW 100 (but where the disc pack 104 is essentially replaced by a single disc 102). Numerous other changes may be made which will readily suggest themselves to those skilled in the art. Accordingly, all such modifications, changes and alternatives are encompassed in the scope of the invention disclosed and as defined in the appended claims.

What is claimed is:

1. A method of writing servo patterns on a disc in an external servo track writer ("STW") including a spindle motor and an actuator assembly having an actuator arm and a dedicated servo writing head, the method comprising steps of:

(a) loading the disc on a spindle shaft of the spindle motor;

(b) enclosing the disc and the actuator arm within an internal enclosure;

(c) closing an outer cover to form an enclosed environment that surrounds the internal enclosure;

(d) activating the spindle motor and the actuator assembly to load the head on the disc;

(e) filling the internal enclosure with a low-density gas to achieve a predetermined concentration and pressure of the low-density gas within the internal enclosure;

(f) writing the servo patterns on the disc while the internal enclosure is filled with the low-density gas;

(g) opening the internal enclosure once the servo patterns have been written to the disc;

(h) purging the low-density gas from the enclosed environment of the external STW to recover the low-density gas while the outer cover remains closed; and (i) opening the outer cover to access the disc once a predetermined amount of the low-density gas has been recovered.

2. The method of claim 1, wherein the predetermined amount is at least 90 percent.

3. The method of claim 1, wherein the activating step (d) is performed prior to the filling step (e) so that the head is loaded on the disc in an air environment.

4. The method of claim 3 wherein the opening step (g) further comprises unloading the head from the disc after opening the internal enclosure so that the head is unloaded substantially in an air environment.

5. The method of claim 4, wherein the external STW comprises a multi-disc servo track writer having a plurality of actuator arms and dedicated servo writing heads, and wherein the loading step (a) further comprises loading a plurality of discs on the spindle shaft of the spindle motor.

6. The method of claim 1, wherein the activating step (d) is performed after the filling step (e) so that the internal enclosure is filled with the low-density gas prior to loading the head on the disc.

7. The method of claim 6 wherein the writing step (f) further comprises unloading the head from the disc once the servo patterns have been written on the disc and prior to the opening step (g) so that the head is unloaded in from the disc while the internal enclosure is filled with the low-density gas.

8. The method of claim 7, wherein the external STW comprises a multi-disc servo track writer having a plurality of actuator arms and dedicated servo writing heads, and wherein loading step (a) further comprises loading a plurality of discs on the spindle shaft of the spindle motor.

9. The method of claim 6 wherein the filling step (e) comprises initially overfilling the internal enclosure with the low-density gas to establish a predetermined pressure greater than an atmospheric air pressure outside of the internal enclosure so that the head is loaded on the disc while the low-density gas within the internal enclosure is at the predetermined pressure.

10. The method of claim 9, wherein the writing step (f) further comprises maintaining the pressure of the low-density gas within the internal enclosure substantially at atmospheric pressure while writing the servo patterns on the disc.

11. The method of claim 10 further comprising the step (j) of overfilling the internal enclosure with the low-density gas to establish a predetermined pressure greater than atmospheric pressure following the writing step (f) and prior to the opening step (g) so that the head is unloaded from the disc while the low-density gas within the internal enclosure is at the predetermined pressure.

12. The method of claim 11, wherein the external STW comprises a multi-disc servo track writer having a plurality of actuator arms and dedicated servo writing heads, and wherein loading step (a) further comprises loading a plurality of discs on the spindle shaft of the spindle motor.

13. An external servo track writer ("STW") for writing servo patterns on a disc in a low-density gas environment, the external STW having a base supporting a spindle motor for rotating the disc and an actuator assembly having an actuator arm and a dedicated servo writing head for writing servo patterns on the rotating disc, the external STW comprising:
   an internal enclosure movable between an open position for loading the disc on the spindle motor and a closed position substantially surrounding the disc and the actuator arm and servo writing head of the actuator assembly;
   an outer cover movable between an open position and a closed position forming a substantially closed internal environment with the base, wherein the internal enclosure is fully contained within the internal environment defined by the outer cover;
   a source of low-density gas connected to a port on the internal enclosure for directing the low-density gas into the internal enclosure prior to writing servo patterns on the disc; and
   an outflow port attached to the outer cover to recover the low-density gas from the internal enclosure.

14. The external STW of claim 13 wherein the outer cover further includes a purge port to introduce purge air into the internal environment at the conclusion of the servo writing procedure to assist with recovery of the low-density gas.

15. The external STW of claim 13 wherein the internal enclosure comprises a fixed portion connected to the actuator assembly and a pivotable portion connected adjacent the spindle motor, wherein the pivotable portion moves between an open position for freely receiving a disc on the spindle motor and a closed position for engaging the fixed portion of the internal enclosure.

16. The external STW of claim 15 wherein each of the fixed portion and the pivotable portion of the internal enclosure defines a cut-out region receiving a portion of a spindle shaft of the spindle motor when the internal enclosure is in the closed position.

17. The external STW of claim 15 wherein the spindle motor holds a plurality of rotating discs and the actuator assembly includes a plurality of actuator arms having a plurality of dedicated servo writing heads for writing servo patterns on the rotating discs.

18. An external servo track writer ("STW") having a spindle motor and an actuator assembly for writing servo patterns on a disc in a low-density gas environment comprising:
   a first enclosure surrounding the disc and the actuator assembly, wherein the first enclosure is filled with the low-density gas prior to writing the servo patterns on the disc; and
   means for recovering low-density gas from the first enclosure during the servo writing process.

19. The external STW of claim 18 wherein the first enclosure surrounds substantially only the disc and an actuator arm of the actuator assembly, and the means for recovering the low-density gas from the first enclosure comprises a second enclosure that surrounds the first enclosure.

* * * * *